(12) United States Patent
Charkov et al.

(10) Patent No.: US 10,303,725 B2
(45) Date of Patent: May 28, 2019

(54) RE-RANKING SEARCH RESULTS FOR LOCATION REFINING AND DIVERSITY

(71) Applicant: Airbnb, Inc., San Francisco, CA (US)

(72) Inventors: Maxim Charkov, San Francisco, CA (US); Surabhi Gupta, San Francisco, CA (US)

(73) Assignee: Airbnb, Inc., San Francisco, CA (US)

(*) Notice: Subject to any disclaimer, the term of this patent is extended or adjusted under 35 U.S.C. 154(b) by 66 days.

(21) Appl. No.: 14/267,204

(22) Filed: May 1, 2014

(65) Prior Publication Data

US 2015/0317400 A1 Nov. 5, 2015

(51) Int. Cl.
| | | |
|---|---|---|
| G06F 16/00 | (2019.01) | |
| G06F 7/00 | (2006.01) | |
| G06F 16/9535 | (2019.01) | |
| G06Q 30/06 | (2012.01) | |
| G06F 16/2457 | (2019.01) | |
| G06F 16/9537 | (2019.01) | |

(52) U.S. Cl.
CPC .... *G06F 16/9535* (2019.01); *G06F 16/24575* (2019.01); *G06F 16/24578* (2019.01); *G06F 16/9537* (2019.01); *G06Q 30/0639* (2013.01)

(58) Field of Classification Search
CPC .......... G06F 17/3087; G06F 17/30241; G06F 17/30265; G06F 17/30864; H04W 4/02
USPC ........................................................ 707/724
See application file for complete search history.

(56) References Cited

U.S. PATENT DOCUMENTS

| | | | |
|---|---|---|---|
| 7,818,315 B2 * | 10/2010 | Cucerzan | .......... G06F 17/30864 707/723 |
| 8,495,046 B1 | 7/2013 | Buchanan et al. | |
| 8,924,378 B2 * | 12/2014 | Cramer | ............ G06F 17/30702 705/14.26 |
| 2007/0214131 A1 | 9/2007 | Cucerzan et al. | |

(Continued)

FOREIGN PATENT DOCUMENTS

| | | |
|---|---|---|
| CN | 101317175 A | 12/2008 |
| CN | 102591911 A | 7/2012 |
| CN | 103620592 A | 3/2014 |

OTHER PUBLICATIONS

Drosou, M. et al., "Search Result Diversification," ACM SIGMOD Record, Mar. 2010, pp. 41-47, vol. 39, No. 1.

(Continued)

*Primary Examiner* — Usmaan Saeed
*Assistant Examiner* — Raquel Perez-Arroyo
(74) *Attorney, Agent, or Firm* — Fenwick & West LLP

(57) ABSTRACT

An online booking system allows users to search and book listings of goods or services. When a user searches for listings, the listings are ranked and scored based on a number of factors including the location and the price of the listing, the number and quality of reviews and the number of successful prior bookings. In some situations, the listing scores overly skew the top ranking results to a particular region. The listing scores may be modified to address this skewing of results. When diversity in search results is desired, the listing scores are modified such that the top ranking results are located in a diverse set of regions. When granular relevance of search results is desired, the listing scores are modified such that the top ranking results are located in regions that are more relevant to the search than the region to which the results are skewed.

20 Claims, 4 Drawing Sheets

(56) References Cited

U.S. PATENT DOCUMENTS

| | | | | |
|---|---|---|---|---|
| 2010/0036807 A1* | 2/2010 | Lieske, Jr. | .......... | G06F 17/3087 |
| | | | | 707/737 |
| 2011/0161242 A1* | 6/2011 | Chung | .................. | G06Q 30/00 |
| | | | | 705/347 |
| 2014/0046965 A1 | 2/2014 | Tian et al. | | |
| 2014/0297630 A1* | 10/2014 | Cao | .................. | G06F 17/30864 |
| | | | | 707/725 |
| 2015/0169573 A1* | 6/2015 | Arora | ................ | G06F 17/30554 |
| | | | | 707/724 |

OTHER PUBLICATIONS

PCT International Search Report and Written Opinion, PCT Application No. PCT/US2015/026474, dated Jul. 1, 2015, 14 pages.
Tang, J. et al., "Evaluation and User Preference Study on Spatial Diversity," Advances in Information Retrieval, Springer Berlin Heidelberg, Mar. 28, 2010, pp. 179-190.

* cited by examiner

RE-RANKING SEARCH RESULTS FOR LOCATION REFINING AND DIVERSITY

BACKGROUND

Many online computer systems offer listings of goods and services for sale, rent, and reservation (for simplicity, "booking" generally) that have or are associated with real world locations that have intangible value to the prospective consumer. For example, in a given city, certain neighborhoods and even particular streets are more desirable than others. A consumer factors the location into their decision whether to book a listing. Existing online computer systems that provide bookings rank listings using location, for example, using a radial distance between a given listing and the designated center of a city, or a reference point, such as a tourist attraction, as one consideration in the ranking.

In some scenarios, the rankings computed for listings may overly skew the top ranked listings towards popular locations or locations that have a relatively large number of listings. As a result, in response to a query that specifies a large geographic area, a consumer may be presented with listings that are not geographically diverse, e.g., clustered in a particular location, even though the geographic area includes many other locations. Similarly, in response to a query that specifies a location, a consumer may be presented with listings that are skewed towards a popular location that is different from the location specified in the query.

SUMMARY

An online booking system allows users to creates listings of goods or services, search listings created by other users, and book listings of interest to them. The online booking system includes a search function that, responsive to a search query, identifies listings that are determined to be relevant to the search query. The relevance may be determined based on factors such as the listing's location relative to a location specified in the search query. The listings are ranked based on the determined relevance of each listing. In various embodiments, to diversify the top ranked listings, some listings may be promoted in ranking such that the top ranked listings include listings from several locations in a geographic area regardless of the determined relevance. In other embodiments, some locations are determined to be more relevant to a search query than other locations. In such embodiments, some listings may be promoted in ranking such that the top ranked listings include at least some listings from locations determined to be more relevant to the search query.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

System Overview

Figure 1:
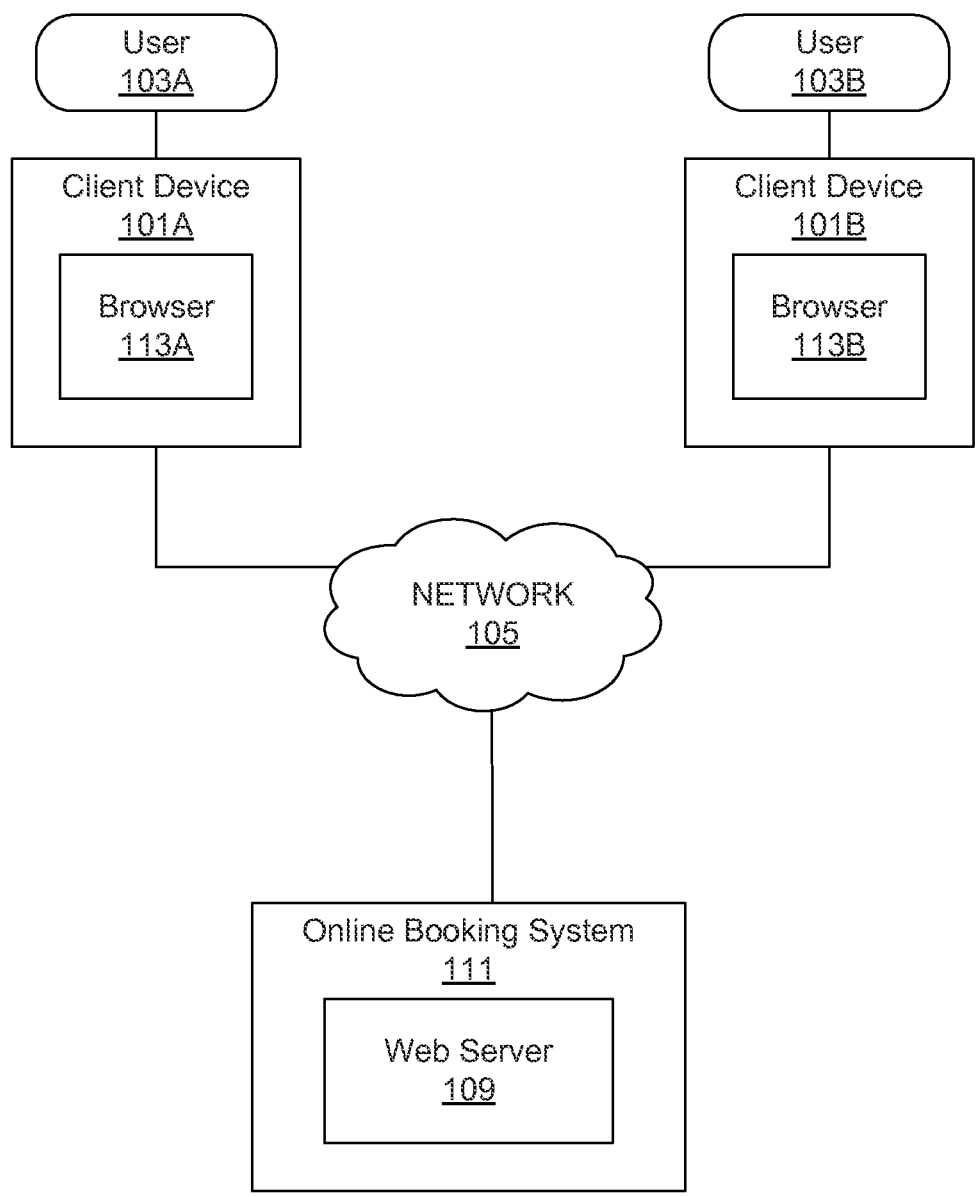
FIG. 1 is a block diagram of a computing environment for an online booking system that ranks listings of goods or services using a location relevance score, according to one embodiment.

FIG. 1 is a block diagram of a computing environment for an online booking system that ranks listings of goods or services using a location relevance score, according to one embodiment. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 (e.g., consumers) and the online booking system 111. In one embodiment, the network is the Internet. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The client devices 101 are used by the users 103 for interacting with the online booking system 111. A client device 101 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The client device 101 executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an interface to interact with the online booking system 111. In other embodiments, the client device 101 may execute a dedicated application for accessing the online booking system 111.

The online booking system 111 includes web server 109 that presents web pages or other web content that form the basic interface visible to the users 103. Users 103 use respective client devices 101 to access one or more web pages, and provide data to the online booking system 111 via the interface.

The online booking system 111 may be, for example, an accommodation reservation system, a dining reservation system, a rideshare reservation system, a retail system, and the like. More generally, the online booking system 111 provides users with access to an inventory of resources (e.g. goods and services) that are available to consumers. The real world, physical location of each resource is considered as a factor in the consumer's decision to consume (e.g., purchase, rent, or otherwise obtain) the resource. Generally, resources available at some locations are more desirable than otherwise identical resources available at other locations. Resources include accommodations, restaurants, vehicles, attractions (e.g., shows, events, and tourist attractions), shopping centers and the like. For example, in an online booking system 111 that provides accommodations, accommodations in particular neighborhoods may be more or less desirable than otherwise identical accommodations in other neighborhoods: a given neighborhood may be considered more interesting, more prestigious, safer, or have some other quality that consumers deem valuable when selecting accommodations.

In some embodiments, the online booking system 111 facilitates transactions between users 103. For example, an accommodation reservation system allows users 103 to book accommodations provided by other users of the accommodation reservation system. A rideshare reservation system allows users 103 to book rides from one location to another. An online market place system allows users 103 to buy and/or sell goods or services face to face with other users. The online booking system 111 comprises additional components and modules that are described below.

Online Booking System Overview

Figure 2:
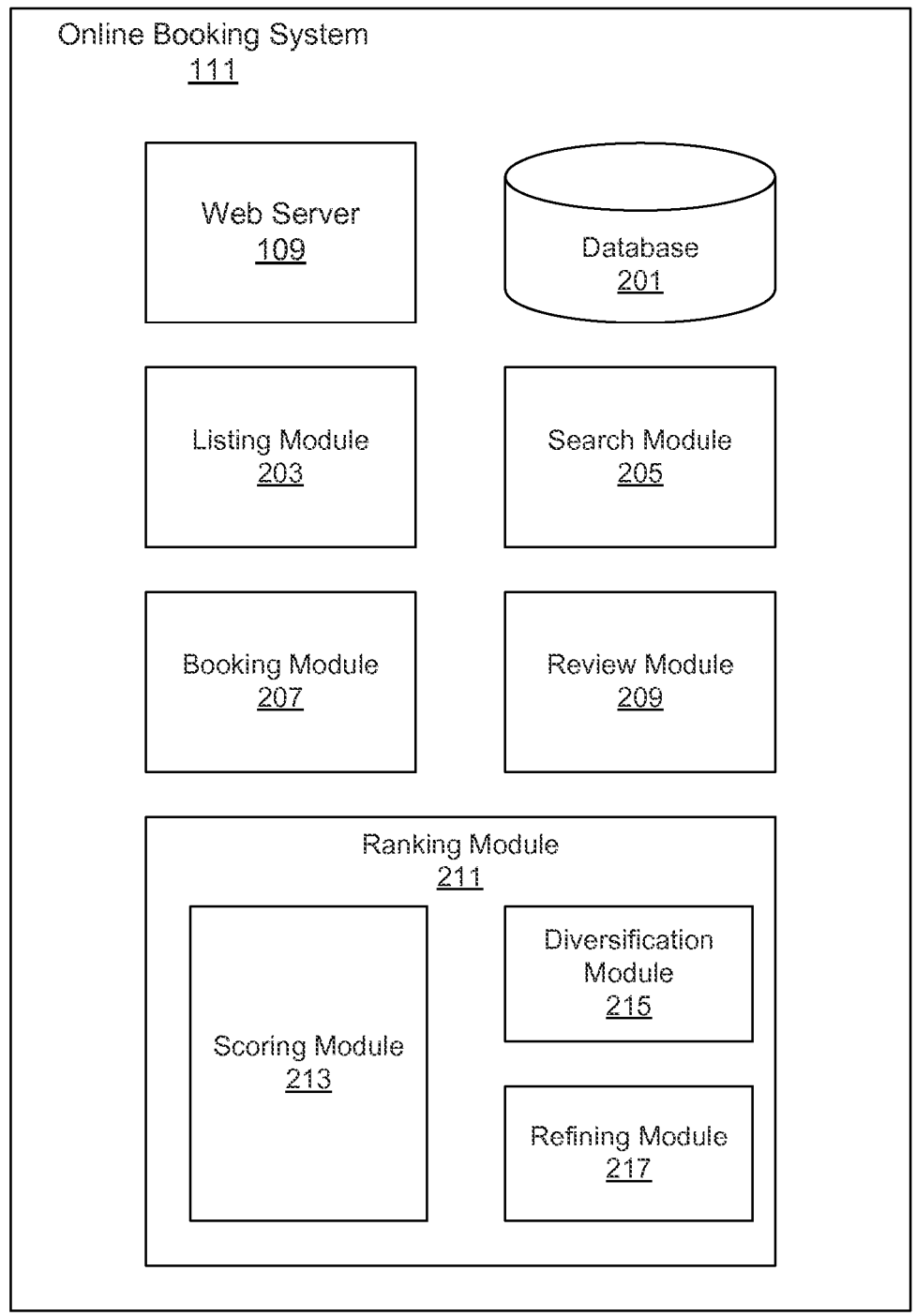
FIG. 2 is a block diagram of an online booking system that ranks listings of goods or services using a location relevance score, according to one embodiment.

FIG. 2 is a block diagram of an online booking system that ranks listings of goods or services using a location relevance score, according to one embodiment. The online booking system 111 includes a database 201, a listing module 203, a search module 205, a booking module 207, a review module 209, and a ranking module 211.

Those of skill in the art will appreciate that the online booking system 111 will contain other modules appropriate for its functionality (e.g., social networking, banking, commerce, etc.), but that are not described herein, since they are not directly material to the invention. In addition, conventional elements, such as firewalls, authentication and encryption systems, network management tools, load balancers, and so forth are not shown as they are not material to the invention. The online booking system 111 may be implemented using a single computer, or a network of computers, including cloud-based computer implementations. The computers are preferably server class computers including one or more high-performance computer processors and main memory, and running an operating system such as LINUX or variants thereof. The operations of the system 111 as described herein can be controlled through either hardware or through computer programs installed in non-transitory computer storage and executed by the processors to perform the functions described herein. The database 201 is implemented using non-transitory computer readable storage devices, and suitable database management systems for data access and retrieval. The database 201 is implemented in a database management system, such as a relational database (e.g., MySQL). The online booking system 111 includes other hardware elements necessary for the operations described here, including network interfaces and protocols, input devices for data entry, and output devices for display, printing, or other presentations of data. As will become apparent below, the operations and functions of the online booking system 111 are sufficiently complex as to require their implementation on a computer system, and cannot be performed as a practical matter in the human mind.

The listing module 203 provides a user interface and processing logic for users to list goods or services for purchase or rent to other users, and is one means for doing so. For example, if the online booking system 111 is an accommodation reservation system, then the listing module 203 provides a user interface suitable for listing accommodations, such as houses, apartments, condominiums, rooms, treehouses, castles, tents, couches, and sleeping spaces. If the online booking system 111 is a dining reservation system, then the listing module 203 provides a user interface for listing available reservations at restaurants, entertainment venues, resorts, etc. If the online booking system is a rideshare reservation system, then the listing module 203 provides a user interface for listing available rides.

The listing module 203 is configured to receive a listing from a user describing the good or service being offered, a time frame of its availability, a price, a location, and other relevant factors. For example, for an accommodation reservation system, a listing includes a type of accommodation (e.g. house, apartment, room, sleeping space, other), a representation of its size (e.g., square footage, or number of rooms), the dates that the good or service is available, and a rental rate (e.g., per night, week, month, etc.). The listing module 203 allows the user to include additional information about the good or service including photographs and other media. The location information for a listing provides specific reference to a physical location or area in the real world, and may include a country, state, city, and neighborhood of the listing, geographical coordinates, mailing addresses, or other suitable location specifying information. The listing module 203 is also capable of converting one type of location information (e.g., mailing address) into another type of location information (e.g., country, state, city, and neighborhood) using externally available geographical map information. Listings created using the listing user interface are processed by the online booking system 111 and stored in the database 201.

In some online booking systems 111, some listings are temporary, are available for booking one time only, and/or are capable of being deleted by the listing user. The listing module 203 stores these historical, unavailable listings in database 201. The online booking system 111 uses these historical listings to analyze the behaviors of users in creating, searching, ranking, and booking listings. Historical listings may be encrypted or otherwise protected so that they are not available to anyone other than the operator of the booking system 111.

The booking module 207 provides a user interface and processing logic for users to view and book listings created by other users. The booking module 207 receives payment information from booking users, and securely transmits the payments to listing users. Any user information transmitted as part of the purchase processed is encrypted for user privacy and protection. Upon completion of a booking, the booking is encrypted and stored as historical booking information in database 201.

The review module 209 provides a user interface and processing logic to receive reviews of the listings offered by other users, providing evaluations, feedback, and other commentary about a listing, and is one means for doing so. Completed reviews be included within and appear alongside listings, so that future users interested in booking the listing can evaluate the listing with the reviews in mind. Reviews are stored alongside their associated listings in the database 201. Similar to historical listings, reviews for historical listings may continue to be stored in database 201 after the listing is no longer available.

The search module 205 provides a user interface and processing logic for searching the database for listings responsive to a search query, and is one means for doing so. The user interface of the search module 205 is configured to receive a search query specifying various attributes of a desired good or service, such as type, location, price, and so forth. The search module matches the attributes of the search query to listings in the database 201, ranks the listings using the ranking module 211, and provides the ranked set of listings to a client device, so that the user of the client device can access the listings in a convenient manner. The user interface of the search module 205 is capable of displaying the ranked set of listings by rank order.

Depending upon the implementation, the user interface for receiving a search query may be simple, allowing for as little as a single text string to be entered as the search query, or it may allow for multiple different kinds of predetermined and/or dynamic input options to be entered in the search query. The user interface provides for specification of a location for inclusion in the search query. The location may be auto-populated with the current location of the client device 101A the user is using to perform the search. Alternatively, the user may manually enter a location in the search query. These may include specification of a country, state (or another regional equivalent such as a province, region, territory, canton, department, county, district, or prefecture), city, neighborhood, or other designation such as geographical coordinates (e.g., longitude, latitude), a street address, and a zip code.

The ranking module 211 provides processing logic to rank listings that match at least part of the search query, and is one means for doing so. The ranking module 211 receives a set of listings responsive to the search query from the search module 205, ranks the listings, and provides a ranked set of listings back to the search module 205. The ranking module 211 ranks the received listings according to the relevance of the listing to the search query as well as according to one or more system preferences for ranking listings. Such system preferences may include diversifying the top ranked results so that a user receives a diverse set of listings in response to the search query. Here, the top ranked results (or top ranked listings) refer to the listings that are provided first to a user for display in response to the user's search query. The number of top ranked results may be equal to the number of results that can be displayed to a user simultaneously on a client device 101. Alternatively, the number of top ranked results may be equal to a configurable number either specified by the online booking system 11 or provided by the user indicating the number of listings the user is interested in viewing in response to the search query.

The ranking module 211 uses the stored historical search, booking, and listing information in order to rank listings. To facilitate this, the search 205 and booking modules 207 store search, listing browsing, and booking information in database 201. This historical information is stored on a per user, per web browsing session basis, such that a user's interactions with the online booking system 111 are stored together, including any search queries entered, any listings viewed, and any bookings made. Storing search queries and subsequent bookings together, particularly allows the online booking system 111 to aggregate useful statistics across many different users. For example based on stored historical bookings and historical search queries, the online booking system 111 is capable of determining for a given search query (or portion thereof), what bookings were made by users who entered that search query. The online booking system can also determine the reverse: for a given booking, what search queries were made by users.

In using historical search, booking, and listing information to rank listings, the ranking module 211 may use any historical period. For example, the ranking module 211 may use listings, bookings, and searches that occurred in the last month, last three months, last 6 months, last year, all time, or any period therebetween. Alternatively, the ranking module 211 may use listings, bookings, and searches from particular periods (e.g., that occurred during a particular season such as winter, or that occurred over Thanksgiving weekend, etc.).

In situations in which the systems discussed here collect personal information about users, or may make use of personal information, the users may be provided with an opportunity to control whether programs or features collect or store user information (e.g., whether to maintain historical listings, historical search queries, and historical bookings), or to control whether and/or how to receive content from the online booking system 111 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as an address, city, or neighborhood), so that a particular location of a user cannot be determined. Thus, the user may have control over how information is collected about the user and used by the online booking system 111.

The ranking module 211 includes a scoring module 213 that computes a listing score for each listing in a set of listings received from the search module 205 responsive to the search query, and is one means for doing so. The listing score may be based on a number of different factors that may vary between different implementations of the online booking system 111. For example, the factors used in an accommodation reservation system may vary from the factors used in a rideshare system, for example. The particular scoring function used is dependent on the nature of the overall system 111 and will thus vary. A suitable scoring function is any scoring function that can be constructed from a combination of the component factors (e.g., a linear combination), and further each component factor can be individually normalized and/or standardized. One factor in the ranking is location relevance score that is based on the real world location of the listing to be ranked as compared to the real world location specified in a received search query. The determination of location relevance score is described in detail below. Other possible factors include, for example, the price of a listing, the number and quality of reviews of the listing provided by other users, the quality of pictures in the list, the number of successful and unsuccessful prior bookings, a reply rate, searching user behavioral signals (like clickthrough from search to listing view or listing view to booking), whether the listing is associated to the searcher via a social networking system social graph.

Location Relevance

The scoring module 213 computes a location relevance score for each of a number of listings to be ranked by the ranking module 211. The location relevance score $R_i$ for a given listing i is determined based on at least one of a city relevance subscore $R_{Ci}$, a neighborhood relevance subscore $R_{Ni}$, and a distance relevance subscore $D_i$. An example formula for the determination of the location relevance score $R_i$ is described below the separate descriptions for the determination of the subscores and $R_{Ci}$, $R_{Ni}$, and $D_i$ that may contribute to the location relevance score $R_i$.

To determine each of these subscores, the scoring module 213 geocodes the location information from the search query. Geocoding is the process of identifying geographic coordinates associated with the location information. Geocoding generates a query country $Q_{I*}$, a query city $Q_{C*}$, and in some cases a query state $Q_{S*}$ (or another regional equivalent) from the location information. Here, the asterisk * denotes a current search query for which the scoring module 213 is currently determining the value of the location relevance score $R_i$. This distinguishes versus the query country $Q_I$, query state $Q_S$, and query city $Q_C$ from historical search queries and bookings stored in database 201 that are used in determining the city $R_{Ci}$ and neighborhood relevance subscores $R_{Ni}$.

City Relevance

The city relevance subscore $R_{Ci}$ represents relevance of city $C_i$ to a user who enters a search query including a query city $Q_{C*}$, query country $Q_{I*}$, and (in some cases) query state $Q_{S*}$. While it may seem obvious that if the user entered a query city $Q_{C*}$, they must be interested in that query city specifically, this is not necessarily the case. Often users are aware of the names of major cities only, and they are unaware of smaller cities located in proximity to larger cities. For example, if the query city $Q_{C*}$ was "Santa Cruz," it is not necessarily a given that the user intended to look for listings in Santa Cruz only. For example, the user may only know of "Santa Cruz", and may be unaware of these other nearby cities, such as Aptos and Capitola, which are popular resort towns. This is a very common problem, as users typically know the names of major cities, such as Manhattan, Los Angeles, San Francisco, etc., but not the names of nearby towns and cities, but which users do in fact frequently visit. This city relevance subscore adjusts for this lack of user information about nearby cities by using historical information about which cities users actually booked in for particular search queries. In very broad terms, the more frequently users booked in a given city A, when searching for city B, the more relevant city A is to a search query for city B. The city relevance subscore $R_{Ci}$ precisely quantifies this relevance relationship.

The scoring module 213 determines a city relevance subscore $R_{Ci}$ for one or more cities ●. For a given listing i in listing city $C_i$, the module 213 assigns the city relevance subscore $R_{Ci}$ for city $C_i$ to listing i. To determine the city relevance subscore $R_{Ci}$, the scoring module 213 uses the query country $Q_{I*}$ and (where applicable) the query state $Q_{S*}$ to uniquely identify the query city $Q_{C*}$, as many different cities around the world share the same name. For example, Springfield Missouri and Springfield, Ill. share the same city name Springfield but are located in different states. Using the geocoded query country $Q_{I*}$ and in some cases the query state $Q_{S*}$ allows for unique identification of the query city $Q_{C*}$.

The scoring module 213 identifies a set of available listings L within a threshold distance to the query city $Q_{C*}$ (e.g., in kilometers). This includes listings within the query city $Q_{C*}$, and may also include listings in other nearby cities, some of which may be in neighboring states and countries. This may include only currently available listings, or it may also include historical listings that are no longer available. In the following description, L will also refer to total number of listings in this set, as will be apparent from the context. The listings L are obtained from database 201.

The scoring module 213 subdivides the set of listings L into subsets, one listing subset $L_C$ for each city having listings in the set L. In the following description, $L_C$ will also refer to the total number of listings in each city, as will be apparent from the context. The subset of listings for the query city $Q_{C*}$ is $L_{C*}$. The number of listings in each city $L_C$ and in the set L is useful for normalizing the city relevance subscore to avoid unduly skewing the city relevance subscore $R_{Ci}$ towards large or small cities.

The scoring module 213 further uses the query country $Q_{I*}$, query state $Q_{S*}$, and query city $Q_{C*}$ to identify historical search queries from database 201 that share the same $Q_I$, $Q_S$, and $Q_C$. Many of the historical search queries will have resulted in historical bookings that occurred subsequent to the user inputting the search query, often during the same web browsing session. However, as above it is not necessarily the case that those prior users ended up booking listings in the same city as the query cities $Q_C$ of their historical search queries. For example, many users searching for "Santa Cruz" as their query city, may end up booking in Aptos, which is nearby.

Using the historical bookings in database 201, the module 213 identifies a total number of bookings $B_Q(C_i)$ in each listing city $C_i$ in which a user ended up booking a listing in after searching using the query city $Q_{C*}$, query country $Q_{I*}$, and query state $Q_{S*}$ (where applicable). The bookings from these cities are also aggregated to determine a total number of historical bookings $B_{QT}$, given the query city $Q_{C*}$, query country $Q_{I*}$, and query state $Q_{S*}$ (also where applicable). For example, a search for "Santa Cruz" may include bookings in Santa Cruz, Aptos, Capitola, and Soquel.

The scoring module 213 uses the above identified quantities to derive additional quantities. The module 213 identifies the probability $P(B_Q(C_i)|B_{QT})$ a user will book a listing in a city $C_i$ of a listing i, given that they entered a search query containing the query city $Q_{C*}$, query country $Q_{I*}$, and query state $Q_{S*}$ (where applicable). This quantity mirrors historically measured behavior, as it may be a common occurrence for users to book in city A after searching for city B. This probability may also be calculated as a percentage/ratio $B_Q(C_i)/B_{QT}$. This quantity expected to be high for most listings where the query city $Q_{C*}$ matches the listing city $C_i$. However, it also expected to be non-zero for many other listing cities $C_i$ that do not match the query city $Q_{C*}$.

The scoring module 213 also identifies the probability $P(Bq(C_i)|B(C_i))$ a user will book in a city $C_i$ of a listing i, relative to the total number of historical bookings $B(C_i)$ that happened in city $C_i$. This probability may also be calculated as a percentage/ratio of $Bq(C_i)/B(C_i)$. Similarly, this quantity is expected to be high for most listings where the query city $Q_{C*}$ matches the listing city C, and it also expected to be non-zero for many other listing cities C that do not match the query city $Q_{C*}$.

In determining the city relevance subscore $R_{Ci}$, the second probability $P(Bq(C_i)|B(C_i))$ can be used to balance out the first probability from the previous paragraph $P(B_Q(C_i)|B_{QT})$. For example, the first probability $P(B_Q(C_i)|B_{QT})$ quantifies the probability people search for one city (e.g., Santa Cruz, New York City), but end up booking in another city (e.g., Aptos, Newark). Despite their differences as cities (e.g., Aptos being smaller and less known to users than Newark), this probability may, in some instances, be comparable for both Aptos and Newark. The second probability $P(Bq(C_i)|B(C_i))$, however, may distinguish between these two types of cities. For example, as Aptos is one of a few small satellite cities surrounding Santa Cruz, it may be the case that the second probability $P(Bq(C_i)|B(C_i))$ indicates that a significant number of people booking in Aptos search for Santa Cruz. More generally, this indicates Aptos's reliance on Santa Cruz searches for bookings. In contrast, the second probability $P(Bq(C_i)|B(C_i))$ may indicate that although many people book in Newark after searching in New York city (as given by the first probability $P(B_Q(C_i)|B_{QT})$), by total count of bookings comparatively few people who book in Newark started by searching for New York city (as given by the second probability $P(Bq(C_i)|B(C_i))$). Thus, although the first probability between two different cities may be comparable (here Aptos and Newark), the second probability may not be. Thus, incorporating both probabilities into the city relevance subscore $R_{Ci}$ provides a more accurate assessment of user knowledge, searching, and booking behavior.

The scoring module 213 determines the city relevance subscore $R_{Ci}$ for a given listing i in city $C_i$ using at least one of $P(B_Q(C_i)|B_{QT})$, $P(Bq(C_i)|B(C_i))$, $L_{Ci}$, and $L_{Ci}/L$. In one general embodiment, the city relevance subscore $R_{Ci}$ is based on $P(B_Q(C_i)|B_{QT})$ and $L_{Ci}$ if the query city $Q_{C*}$ is in the same city as the listing's city $C_i$ ($Qc^*=C_i$, $L_{Ci}=L_{C*}$) whereas the city relevance is subscore is based on all four of the above values if the query city $Q_{C*}$ is not the same as the listing city $C_i$ ($Qc^* \ne C_i$, $L_{Ci} \ne L_{C*}$)

In one specific embodiment, the city relevance subscore $R_{Ci}$ is determined according to:

$$R_{Ci} = \begin{cases} N_i & \text{if } Q_{C*} = C_i \\ W_i N_i & \text{if } Q_{C*} \ne C_i \end{cases}$$

where $N_i$ is given by $$N_i = \frac{P(B_Q(C_i)|B_{QT})}{M \cdot (L_{Ci})^{1/f}}$$

where f is a numerical value greater than 1 (e.g., if f=2, 1/f is a square root operation), M is a normalizing score such that $M=\max_i$, $N_i$, and $W_i$ is an additional weighting factor given by:

$$W_i = \left(1 + \left(1 - \left(\frac{L_{Ci}}{L}\right)\right)\right) \cdot P(B_Q(C_i)|B(C_i))$$

Generally, the above mentioned embodiments return different values for $R_{Ci}$ depending upon whether the query city $Q_{C*}$ matches the listing's city $C_i$. If they do match, then the listing will have an $R_{Ci}$ value of $N_i$. If they do not match, an additional weighting factor results in an $R_{Ci}$ value modified from $N_i$.

Generally, this additional weighting factor W will have different effects in different circumstances. The weighting factor will generally be larger for smaller cities with listings that are frequently booked subsequent to (e.g., during the same browsing session as) a search using a query city that is another larger, more well known city. Using the example introduced above, if Aptos includes well-regarded listings that are frequently booked after a user searches for Santa Cruz, then the weighting factor for Aptos listings will be relatively higher, ultimately causing $R_{Ci}$ to be higher, thereby causing Aptos listings to be ranked more highly in search results for Santa Cruz than they would be otherwise.

On the other hand, the weighting factor will generally be smaller for larger cities that are not frequently booked subsequent to a search query using another query city For example, if users search for New York and they do not frequently end up booking in cities in New Jersey even though they are just across the Hudson River, the weighting factor for New Jersey listings will be relatively lower, thereby causing $R_{Ci}$ to be lower, thereby causing New Jersey listings to not be ranked as highly compared to listings in New York.

Neighborhood Relevance

Often users are looking to book listings where location is one only representation of the type of place (e.g., general atmosphere) in which they want to book a listing. For example, a restaurant located in a interesting part of town may be more desirable than a restaurant that is isolated from activity off a freeway. The neighborhood relevance subscore $R_{Ni}$ is one way of quantifying the intangible values that distinguish otherwise comparable listings where distance between the user and the listing alone is insufficient. The neighborhood relevance subscore $R_{Ni}$ quantifies these intangible values by using historical information about which neighborhoods users actually booked in, and/or historical information about which neighborhoods listings were/are located in. In very broad terms, in one case the more frequently users booked in a given neighborhood relative to other neighborhoods, the greater the neighborhood relevance subscore $R_{Ni}$ for that neighborhood. Further, the number of listings in a given neighborhood, either by count or relative to the number of listings in other neighborhoods, may be used as a normalizing factor in the relevance subscore $R_{Ni}$ for that neighborhood to avoid biasing towards or against neighborhoods have greater or fewer listings.

The scoring module 213 determines a neighborhood relevance subscore $R_{Ni}$ for one or more neighborhoods in the query city $Q_{C*}$. For a given listing i in listing neighborhood $N_i$, the module 213 assigns the neighborhood relevance subscore $R_{Ni}$ for neighborhood $N_i$ to listing i.

To determine the neighborhood relevance subscore $R_{Ni}$, the scoring module 213 uses the query country $Q_{T*}$, query state $Q_{S*}$, and query city $Q_{C*}$ to identify a set of available listings in a city $L_{C*}$ containing listing i. This may include only currently available listings, or it may also include historical listings that are no longer available. In the following description, $L_C$ will also refer to total number of listings in this set, as will be apparent from the context. The listings $L_C$ are obtained from database 201. The scoring module 213 subdivides the set of listings $L_C$ into subsets, one subset of listings $L_N$ for each neighborhood in the query city $Q_{C*}$. In the following description, $L_N$ will also refer to the total number of listings in each neighborhood, as will be apparent from the context. The scoring module 213 determines the number of listings in a neighborhood $L_N$ by accessing the listings in database 201 to identify the neighborhood in which each listing is located. This information may be have been provided by the listing user. Alternatively, neighborhood information may be accessed or provided by an external source. For example, an exogenously generated database may provide correlations between locations and neighborhoods.

The scoring module 213 determines the neighborhood relevance subscore $R_{Ni}$ based on at least one of a number of listings $L_N$ in the neighborhood $N_i$, a probability $P(B_N(N_i)|B_C)$ of booking a listing $B_N$ in neighborhood $N_i$ relative to the total number of bookings $B_C$ in the city $C_i$, and a probability $P(L_N(N_i)|L_C(C_i))$ of listing i being in neighborhood $N_i$ (given by $L_N(N_i)$) relative to the total number of listings $L_C$ in city $C_i$.

The scoring module 213 determines the probability $P(B_N(N_i)|B_C(C_i))$ by accessing historical bookings from database 201. The module 213 identifies the total number of historical bookings of listings in each neighborhood $B_N$ separately for each neighborhood in a city, as well as the total number of historical bookings of listings in the city $B_C$ across all included neighborhoods. The probability $P(B_N(N_i)|B_C)$ may also be calculated as a percentage/ratio $B_N(N_i)/B_C(C_i)$.

The scoring module 213 determines the probability $P(L_N(N_i)|L_C(C_i))$ by accessing currently available and/or historical listings from database 201. The module 213 identifies the total number of listings in each neighborhood $L_N$ in a city, as well as the total number of listings in the city $L_C$ across all included neighborhoods. The probability $P(L_N(N_i)|L_C(C_i))$ may also be calculated as a percentage/ratio $L_N(N_i)/L_C(C_i)$.

In one embodiment, the scoring module 213 determines the neighborhood relevance subscore $R_{Ni}$ according to:

$$R_{Ni} = \begin{cases} P(B_N(N_i)|B_C) & \text{if } Q_{C*} = C_i \\ 0 & \text{if } Q_{C*} \neq C_i \end{cases}$$

Generally, this calculation of the neighborhood relevance subscore $R_{Ni}$ will result in a higher value for listings that are located in neighborhoods in which bookings occur more frequently, and listings appear more often relative, to other neighborhoods in the same city. The increased frequency of listings and bookings for a given neighborhood relative to others is taken indicative of a higher degree of intangible value of that neighborhood to consumers.

Distance Relevance

Generally, the distance relevance subscore $D_i$ quantifies the distance between the location of the search query and the location of a listing, such that listings that are ranked further away are ranked lower using a non-linear function of distance. The reason a non-linear function is used is because greater distances impose more than a simple linear increase in inconvenience or cost to users; in other words, being ten miles away from a desired location is more than simply twice as inconvenience than being five miles away. In one embodiment, this distance d is determined from a center of a query city or neighborhood, as determined by geographical extent or population density. In another embodiment, an external data source may provide the geographical location from which the distance d is determined. In another embodiment, the distance d is measured based on a distance between the listing i and a user's current location, for example as provided by the client device 101 (e.g., a smart phone).

The distance relevance subscore $D_i$ may be a sigmoidal, exponential, stepped, piecewise linear, or other any other type of function. In one embodiment, $D_i$ is determined according to $$D_i = \frac{a}{1 + e^{(d/b)-c}}$$

where d is the distance between the location specified in the query, and a, b and c are configurable constants.

Location-Based Result Diversification

A search query may specify a geographic area, such as a country, having multiple regions, such as cities, districts, or boroughs. In some scenarios, the user who provides a search query specifiying a large geographic area is interested in viewing listings located in several of the regions in the geographic area. However, when the scoring module 213 scores listings responsive to such a query (using, for example, the scoring techniques discussed above), there may be many listings in more popular regions with scores higher than the scores of even the highest scoring listings in less popular regions. Such disparity may be the result of a number of factors, examples of which include difference in the total number of listings in the popular regions relative to the less popular regions or the number of bookings previously made in the popular regions relative to the less popular regions. For example, if the search query specifies France, a geographic area having multiple cities, then there may be many listings in Paris, one of the more popular of French cities, that all have higher scores than even the highest scoring listing in Lyon, one of the less popular French cities. Because listings are displayed in a ranked order determined based on their scores, this scoring disparity results in listings from popular regions crowding listings from less popular regions, resulting in little or no display space being given to listings in less popular regions. Thus, using the location relevance calculation described above, a user who is interesting in viewing listings from many different regions in a geographic area may only be presented, at least initially, with listings in popular regions.

To counter the lack of regional diversity in the top ranked listings for a geographic area, the diversification module 215 promotes listings in the ranking such that the top ranked listings include listings from several regions in the geographic area regardless of score, and is one means for doing so. In operation, when the search query specifies a geographic area having multiple regions, the scoring module 213 transmits a set of scored listings determined based on the search query to the diversification module 215. The set of scored listings received by the diversification module 215 may already be ordered according to the scores of the listings. As discussed above, the scoring module 213 computes the score for each listing based on a number of different factors, such as location, price, listing reviews, listing quality, and historical bookings as determined by the scoring function configured in the scoring module 213.

In response to receiving the set of scored listings, the diversification module 215 identifies the regions in the geographic area specified by the search query. The regions may be identified based on geographic data available within the database 201. Alternatively, the regions may be identified as all the unique regions within which the set of scored listings are located. For example, if the scored listings include seventeen listings located in Paris, six in Nice and two in Lyon, then the regions identified by the diversification module 215 include Paris, Nice and Lyon. The diversification module 215 selects at least a subset of the identified regions from which listings are to be promoted (referred to herein as the "regions to be promoted"). The diversification module 215 may select each region to be promoted based on information available in the database 201, such as the number of listings and historical booking information in the region or well-known facts known about the region, such as attractions, population and weather patterns. In one embodiment, the regions to be promoted may be selected based on the relevance of the region to the search query, as determined by the city relevance computation outlined above.

In order to diversify the top ranked listings, the diversification module 215 modifies the scores of the listings such that the top ranked listings include listings located in each of at least a subset of the regions to be promoted. In operation, the diversification module 215 determines a total number of the listings that are to be promoted in order to diversify the top ranked listings (referred to herein as the "promotion number"). The promotion number may be equal to the number of regions to be promoted or the number of regions to be promoted that have a booking history above a threshold. In an alternate embodiment, the promotion number may be equal to the number of regions to be promoted multiplied by a promotion factor. The promotion factor is an integer greater than one that indicates how many listings to be promoted from each of the regions to be promoted. This ensures that at least one listing from each of the regions to be promoted is included in the top ranked listings. In another alternate embodiment, the promotion number may be computed as a function of the number of listings that can be displayed at once on a display page. For example, if the display page allows for ten listings to be displayed at once, then the promotion number may be half of ten, i.e., five, such that at least five of the ten listings displayed are located in different regions.

The diversification module 215 sequentially traverses the set of scored listings and modifies the scores (and, therefore, the rankings) of at least a subset of those listings based on the regions in which those listings are located. The number of listings for which the scores are modified is equal to the promotion number. While sequentially traversing the set of scored listings, the diversification module 215 tracks the number of listings that have already been promoted, the regions from which listings have already been promoted and the rank to which the most recently promoted listing was promoted. The diversification module 215 may also track the region in which the current top ranked listings are located. Even though this top ranked listing may not change rank in the diversification process, the top ranked listing may considered to have been promoted for purposes of tracking the number of listings to promote and the regions from which listings have already been promoted. In one embodiment, the set of scored listings are represented as an array, and the rank of a given listing is an index into the array. The index may be used to determine the score of the listing having that rank.

In operation, for each listing in the set of scored listings, the diversification module 215 determines the region in which the listing is located. If the region is one of the regions to be promoted, then the diversification module 215 determines whether the number of listings that have already been promoted equals to the promotion number, i.e., whether the promotion number has been exhausted. If so, then no other listings can be promoted and the diversification module 215 stops traversing the set of the scored listings.

If the promotion number has not been exhausted, then the diversification module 215 determines whether a listing from the region in which the current listing is located has already been promoted. If a listing from the region has already been promoted, then the diversification module 215 proceeds with promotion only if listings have been promoted from all of the regions to be promoted. This occurs in the scenario where more than one listing from the same region may be promoted, such as where the promotion number is greater than the number of regions to be promoted (e.g., where the promotion factor is greater than one). If a listing from the region has not already been promoted, then the diversification module 215 can proceed to promote the listing.

In alternate embodiments, a different technique may be used to determine whether a listing from a particular region should be promoted. For example, the diversification module 215 may compare the regions in which the current top listings are located ("the current regions") with the regions to be promoted. If a listing currently being evaluated falls in a region that is in the regions to be promoted but not in the current regions, then the listing should be promoted.

To promote the listing, the diversification module 215 recomputes the score of the listing such that the ranking of the listing is directly below the ranking of the most recently promoted listing. In the preferred embodiment, the diversification module 215 recomputes the score according the following function:

$$s_i = \frac{s_p + s_{p+1}}{2}$$

where $s_i$ is the recomputed score for the current listing being promoted, p is the ranking of the most recently promoted listing, $s_p$ is the score of the of the most recently promoted listing and $s_{p+1}$ is the score of the listing ranked directly below the most recently promoted listing. In one embodiment, if the first listing in the set of scored listings is located in a region to be promoted, then that listing is considered promoted but the score of that listing is not modified as the listing already has the highest score of any listing and is, therefore, in the top ranked listings.

The diversification module 215 traverses the set of scored listing in the manner described above until either all of the listings have been traversed or the promotion number has been exhausted. The result of the traversal is a re-ranked set of listings where the top ranked listings are located in at least several, if not all, of the regions to be promoted. The re-ranked set of listings is transmitted by the ranking module 211 to the search module 205 for transmission to the user for display.

Operational Example

An example of the operation of the diversification module 215 is as follows. For a search query "Country=France," the scoring module 213 transmits the following set of scored listings to the diversification module 215. As shown, the listings are ranked according to their relative scores.

TABLE 1

| Rank | Listing ID | Score | Region |
|------|------------|-------|--------|
| 1 | 4235 | 96 | Paris |
| 2 | 2354 | 84 | Paris |
| 3 | 6453 | 82 | Paris |
| 4 | 3426 | 79 | Paris |
| 5 | 9893 | 77 | Lyon |
| 6 | 3631 | 70 | Lyon |
| 7 | 3522 | 65 | Nice |
| 8 | 8729 | 62 | Bordeaux |

The diversification module 215 selects cities in France from which listings are to be promoted. Based on their relevance determined based on several factors, the diversification module 215 selects Paris, Nice and Lyon, ranked in that order, as the cities to be promoted. The diversification module 215 also determines a promotion number. In this example, the promotion number is determined to be equal to the number of cities selected, i.e., 3, and the promotion factor is 1. Other mechanisms for determining the promotion number are described above. The diversification module 215 traverses the set of scored listings to promote listings based on the cities in which the listings are located and the promotion number.

In the first step, the diversification module 215 determines the city in which the first listing, listing 4235, is located. Listing 4235 is located in Paris, and Paris is one of the selected cities. Therefore, the diversification module 215 promotes listings 4235, but, because listing 4235 is already the top ranked listing, its scores and rankings are not modified. The diversification module 215 subsequently sets the following variables/arrays:

already_promoted=1 cities_promoted=[Paris]

last_promoted=1 where already_promoted is the number of listings already promoted, cities_promoted is the array of cities from which listings have been promoted and last_promoted is the ranking of the last lasting that was promoted.

In the second step, the diversification module 215 determines the city in which the second listing, listing 2354, is located. Listing 2345 is located in Paris, and, because a listing located in Paris has already been promoted, as indicated by the cities_promoted array, the diversification module 215 does not promote listing 2345. The same applies to listing 6453 and listing 3426. When the diversification module 215 reaches listing 9893, the diversification module 215 determines that the listing is located in Lyon, which is one of the selected cities and for which a listing has not yet been promoted. Therefore, the diversification module 215 promotes listings 9893 such that listing 9893 is ranked between listing 4235 and listing 2345. The new score of listing 9893 is computed based on the score of the listing indicated by the last_promoted variable, i.e., the score of listing 4235. In alternate embodiments, the last_promoted variable is not separately tracked, and the new score of a listing is determined based on the score of the listing indicated by the already_promoted variable. The diversification module 215 subsequently sets the following variables/arrays:

already_promoted=2 cities_promoted=[Paris, Lyon]

last_promoted=2

As with listings 2345, 6453 and 3426, the diversification module does not promote listing 3631 since a listing located in Lyon has already been promoted as indicated by the cities_promoted array. When the diversification module 215 reaches listing 3522, the diversification module 215 determines that the listing is located in Nice, which is one of the selected cities. Therefore, the diversification module 215 promotes listings 3522 such that listing 3522 is ranked between listing 9893 and listing 2345. The new score of listing 9893 is computed based on the score of the listing indicated by the last_promoted variable, i.e., the score of listing 9893. The diversification module 215 subsequently sets the following variables/arrays:

already_promoted=3 cities_promoted=[Paris, Lyon, Nice]

last_promoted=3

At this stage, the number of listings promoted is equal to the promotion number that was determined, i.e., the promotion number is exhausted. Therefore, the diversification module 215 does not promote any more listings. The re-ranked listings are shown in Table 2 below. As shown, the top ranking listings include listings from each of the selected cities and are diverse relative to each other.

TABLE 2

| Rank | Listing ID | Score | Region |
| --- | --- | --- | --- |
| 1 | 4235 | 96 | Paris |
| 2 | 9893 | 90 | Lyon |
| 3 | 3522 | 87 | Nice |
| 4 | 2354 | 84 | Paris |

TABLE 2-continued

| Rank | Listing ID | Score | Region |
| --- | --- | --- | --- |
| 5 | 6453 | 82 | Paris |
| 6 | 3426 | 79 | Paris |
| 7 | 3631 | 70 | Lyon |
| 8 | 8729 | 62 | Bordeaux |

Exemplary Method

Figure 3:
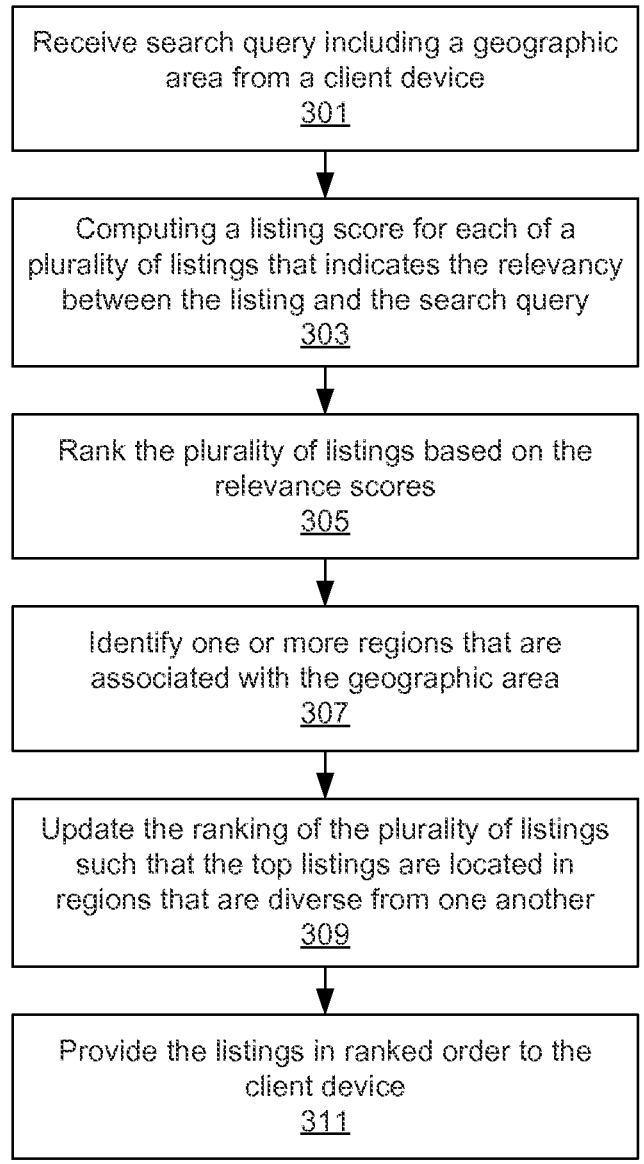
FIG. 3 is a flow chart for scoring listings of goods or services to diversify the top scoring listings, according to one embodiment.

FIG. 3 is a flow chart for scoring listings of goods or services to diversify the top scoring listings, according to one embodiment. In step 301, the online booking system 111 receives a search query from a client device, where the search query specifies a geographic area that includes multiple regions. In step 303, the online booking system 111 computes a listing score for each of a plurality of stored listings for goods or services. The listing score for a listing is based on at least one of a city relevance subscore, a neighborhood relevance subscore, and a distance subscore. In step 305, the online booking system 111 ranks the listings based at least in part on the location relevance score. The rankings may also be based on other factors, for example the number of reviews provided by users for a listing, the number of bookings of the listing, the price of listing, and so on. In step 307, the online booking system 111 identifies one or more regions includes in the geographic area specified by the search query. In step 309, the online booking system 111 updates the rankings of the listings such that the top ranking listings are located in regions that are diverse from one another. In step 311, the online booking system 111 provides the listings to the client device in ranked order.

Location-Based Result Refining

A search query may specify a region, for example the city of Daly City, that is geographically near other regions, such as the cities of San Francisco and South San Francisco. When the scoring module 213 scores listings responsive to such a query, the scores of listings in those other nearby regions (e.g., San Francisco) may be significantly higher than scores of listings in the region specified by the search query (e.g., Daly City). Such disparity may result from differences in the total number of listings in each region, differences in the number of bookings previously made in each region, quality of listings, numbers of reviews of listings, etc. Because listings are displayed in a ranked order determined based on their scores, this scoring disparity can result in many listings in the other regions (e.g., San Francisco) being ranked and displayed above listings located in the region specified by the search query (e.g., Daly City). Thus, a user who is interesting in viewing listings from the region specified in the search query may be presented, at least initially, with listings in other regions instead.

The refining module 217 in the ranking module 211 modifies the scores of the listings to intersperse listings located in regions that are determined to be relevant to the search query with listings in other regions, and is one means for doing so. In operation, when the search query specifies a particular region, the scoring module 213 transmits a set of scored listings relevant to the search query to the refining module 217. The set of scored listings received from the scoring module 213 is may already be ordered according to the relative scores of the listings.

In response to receiving the set of scored listings, the refining module 217 identifies all the unique regions within which the set of scored listings are located. For each of the identified regions, the refining module 217 computes a relevance between the region and the region specified in the search query (referred to herein as the "search region"). The relevance may be the city relevance, the neighborhood relevance, or the distance relevance as described above, or another relevance. The refining module 217 generates a region set that includes each of the identified regions ordered according to their relative relevance to the search region. The refining module 217 also generates a different listing set associated with each of the identified regions. Each listing set includes all of the listings in the set of scored listings that are located in the associated identified region. The listings in each listing set are ordered according to their relative listing scores computed by the scoring module 213. In one embodiment, the listing sets are arrays and the index of the array may be used to determine the score of the listing at that index location.

To promote listings located in more relevant regions that have scores sufficiently low that they would be provided or displayed, the refining module 217 determines a number of listings located in each identified region that are to be promoted (referred to herein as the "promotion number"). The promotion number for a particular identified region may be computed as a function of the computed relevance between the identified region and the search region, it may be dynamic based on other factors such as the number of top listings to be provided for display, or it may be static for one or more regions. In one embodiment, the number of cities to be promoted from a region is computed according to the following function:

$$\text{num\_promoted}_i = N_{base} \times R_i$$

where $\text{num\_promoted}_i$ is the promotion number, $N_{base}$ is a constant indicating a baseline number of listings to be promoted and $R_i$ is the relevance score of the region.

The refining module 217 iteratively uses the promotion numbers for the identified regions to determine, for each region, how the rankings of the listings located in that region should be changed such that listings located in regions that are more relevant to the search query are interspersed with listings located in less relevant regions. In operation, for a given region, the refining module 217 computes a demotion factor for the region based on the promotion number of the immediately previous region (e.g., more relevant to the search query) in the region set. In one embodiment, the demotion factor for a region may be computed according to the following function:

$$\text{demotionFactor}_i = \frac{\text{scoreMatch}_{i-1}}{\text{topListingScore}_i} \times \text{demotionFactor}_{i-1}$$

where $\text{demotionFactor}_i$ is the demotion factor for a particular region at index i in the region set (the "current region"), $\text{scoreMatch}_{i-1}$ is the score of a listing located in a region at index i−1 in the region set (the "more relevant region"), $\text{topListingScore}_i$ is the score of the top scoring listing located in the current region, and the $\text{demotionFactor}_{i-1}$ is the previously computed demotion factor for the more relevant region. The $\text{scoreMatch}_{i-1}$ is determined by retrieving the score of the listing from the listing set associated with the more relevant region at an index equal to the promotion number for the more relevant region. The $\text{topListingScore}_i$ is determined by retrieving the score of the listing from the listing set associated with the current region at index zero.

While the embodiment described above provides a specific technique for computing the demotion factor, persons skilled in the art will recognize that other techniques for computing demotion factors are within the scope of this invention. Specifically, any promotion or demotion factor that, when applied to listing scores, causes the listings to be reordered such that at least some of the listings located in more relevant regions are scored higher than listings located in less relevant regions is within the scope of this invention.

Once computed, the refining module 217 applies each demotion factor to the listing score of listings located in the associated region. Applying the demotion factor to the scores of listings located in the region causes at least a subset of the listings to be demoted below listings in the more relevant region—effectively promoting listings in the more relevant region. The refining module 217 then re-ranks the listings according to the modified scores. The re-ranked set of listings is transmitted by the ranking module 211 to the search module 205 for transmission to the user for display.

Operational Example

An example of the operation of the refining module 217 is as follows. For a search query "City=Daly City," the scoring module 213 transmits the following set of scored listings to the refining module 217. As shown in Table 3, the listings are ranked according to their relative scores.

TABLE 3

| Rank | Listing ID | Score | Region |
|------|-----------|-------|--------|
| 1 | 3435 | 96 | San Francisco |
| 2 | 5534 | 84 | San Francisco |
| 3 | 2325 | 82 | San Francisco |
| 4 | 7874 | 79 | South San Francisco |
| 5 | 4587 | 77 | Daly City |
| 6 | 2897 | 70 | Daly City |
| 7 | 7878 | 65 | South San Francisco |
| 8 | 2329 | 62 | Daly City |

The refining module 217 generates a listing set for each of the regions in Table 3. The listing set for a given region includes a list of ordered scores of listings located in that region. In one embodiment, the listing sets are structured as: San Francisco=[96, 84, 82]; South San Francisco=[79, 65]; Daly City=[77, 70, 62]. The refining module 217 also generates a region set including the regions in Table 3 ordered according to their relevance to the search region "Daly City." In one embodiment, the region set is structured as: [Daly City:1; South San Francisco:0.8; San Francisco: 0.5], indicating that Daly City is more relevant to the search query than South San Francisco, and South San Francisco is more relevant to the search query that San Francisco.

The refining module 217 then computes a promotion number for each of the regions in the region set. The promotion number is a function of the relevance scores computed for the regions. For this example, the promotion number for a region is computed as the floor of three times the relevance score for the region. Therefore, the promotion numbers are: Daly City=3, South San Francisco=2, and San Francisco=1. The refining module 217 computes demotion factors for each region based on the promotion number of the region that is immediately more relevant than that particular region. Since Daly City is the most relevant region to the search region, the demotion factor for Daly City is "1." The demotion factors for the remaining regions, South San Francisco and San Francisco, are iteratively computed as follows. For this example, the demotion factor is computed according to the formula:

$$\text{demotionFactor}_i = \frac{\text{scoreMatch}_{i-1}}{\text{topListingScore}_i} \times \text{demotionFactor}_{i-1}$$

As discussed above, the scoreMatch$_{i-1}$ is determined by retrieving the score of the listing from the listing set associated with the more relevant region at an index equal to the promotion number for the more relevant region. The topListingScore$_i$ is determined by retrieving the score of the listing from the listing set associated with the current region at index zero. In this example, the demotion factor for South San Francisco is $$0.78\left(\frac{62}{79} \times 1\right)$$

and for San Francisco is $$0.55\left(\frac{65}{96} \times 0.82\right).$$

The refining module 217 then applies the demotion factors to the scores of the listings in each listing set. The scores in the listing set for Daly City remain unchanged since the demotion factor is 1 and are Daly City=[77, 70, 62]. The scores in the listing set for South San Francisco are modified to South San Francisco=[61, 50], and the scores in the listing set for San Francisco are modified to San Francisco=[52, 46, 45]. The listings in Table 3 are then re-ranked according to the new relative scores. The new scores and rankings are show in in Table 4 below. As shown, the top ranking listings include listings from Daly City and South San Francisco, which were regions deemed to be more relevant to the search region than San Francisco.

TABLE 4

| Rank | Listing ID | Score | Region |
| --- | --- | --- | --- |
| 1 | 4587 | 77 | Daly City |
| 2 | 2897 | 70 | Daly City |
| 3 | 2329 | 62 | Daly City |
| 4 | 7874 | 61 | South San Francisco |
| 5 | 3435 | 52 | San Francisco |
| 6 | 7878 | 50 | South San Francisco |
| 7 | 5534 | 46 | San Francisco |
| 8 | 2325 | 45 | San Francisco |

Exemplary Method

Figure 4:
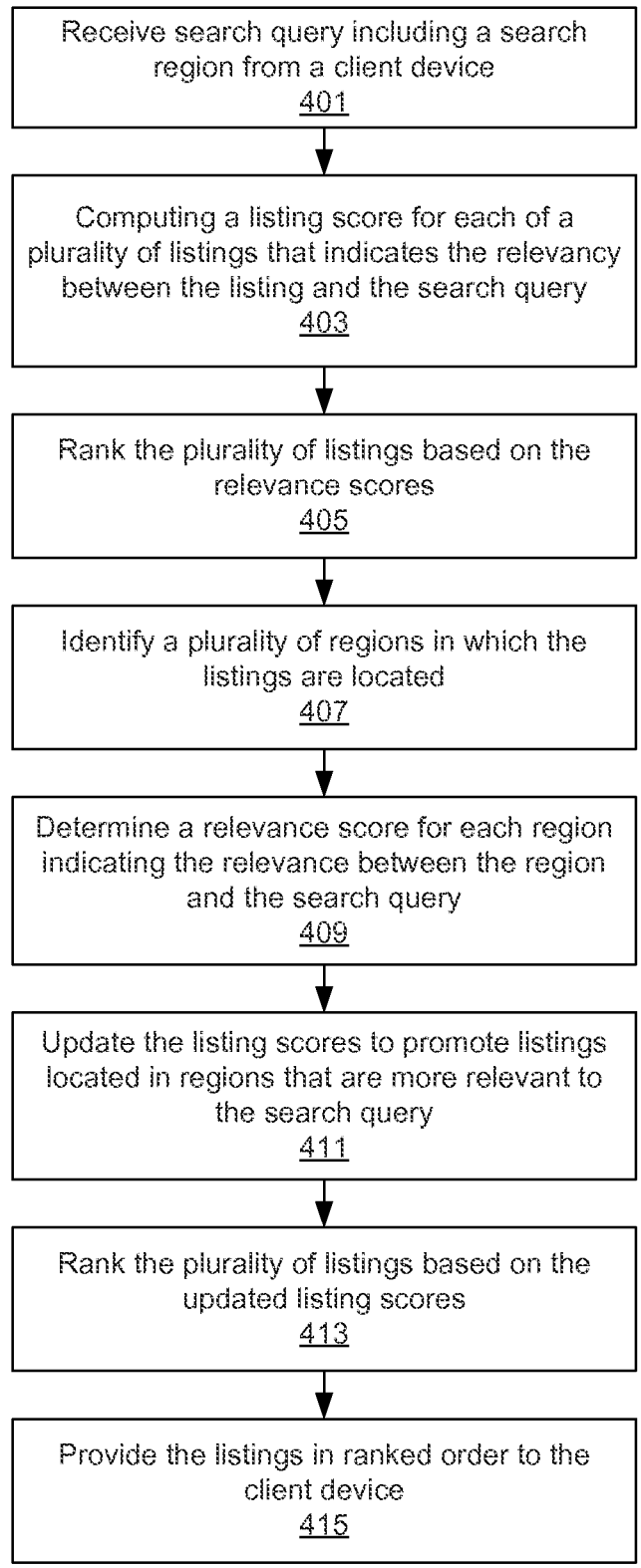
FIG. 4 is a flow chart for scoring listings of goods or services to rank listings based on a search query and a relevance of a region in which the listing is located, according to one embodiment.

FIG. 4 is a flow chart for scoring listings of goods or services to rank listings based on the relevance of a region in which the listing is located and a search query, according to one embodiment. In step 401, the online booking system 111 receives a search query from a client device, where the search query specifies a geographic region. In step 403, the online booking system 111 computes a listing score for each of a plurality of stored listings for goods or services. The listing score for a listing is based on at least one of a city relevance subscore, a neighborhood relevance subscore, and a distance subscore. In step 405, the online booking system 111 ranks the listings based at least in part on the location relevance score. The rankings may also be based on other factors, for example number of reviews provided by users for a listing, the number of bookings of the listing, the price of listing, and so on. In step 407, the online booking system 111 identifies one or more regions in which the listings are located. In step 409, the online booking system 111 determines a relevance score between each of the identified regions and the region specified in the search query. In step 411, the online booking system 111 updates the scores of the listings to promote listings located in regions that are more relevant to the region specified in the search query. In step 413, the online booking system 111 updates the rankings of the listings based on the updated scores. In step 415, the online booking system 111 provides the listings to the client device in ranked order.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer implemented method, comprising:
   receiving a search query from a client device, the search query including a geographic area that includes at least a plurality of regions;
   accessing a plurality of entities associated with a geographical location, each of the entities located in one of the plurality of regions;
   computing, by a computer processor, an entity score for each of the entities based at least on the region in which the entity is located and the search query;
   ranking the entities according to the entity scores, the ranked entities including a top subset of entities ranked above a remainder of the entities in the ranked entities, the top subset of entities located in a subset of the regions;
   re-computing the entity score for a first entity in the remainder of the entities based on a combination of the entity scores of a second entity and a third entity in the top subset of entities, the first entity located in one of the regions not included in the subset of the regions, the recomputed entity score falling between the entity scores of the second entity and the third entity;
   modifying the rankings of the top subset of entities based on the recomputed entity score to add the first entity to the top subset of entities between the second entity and the third entity;
   re-computing the entity scores for each of a plurality of entities in the remainder of the entities, each of the recomputed entity scores based on a combination of the entity scores of a most recently promoted entity score and a lower ranked score;
   modifying the rankings based on the recomputed entity scores; and
   providing, to the client device, information for display as a graphical user interface on a display of the client device, the user interface including an ordered list of the plurality of entities based on the modified rankings to the client device, the user interface for allowing the user to select and book a entity of the plurality of entities.

2. The method of claim 1, wherein the geographic area includes regions other than the plurality of regions.

3. The method of claim 2, further comprising computing a relevance between the search query and each of the regions included in the geographic area to determine that the plurality of regions are relevant to the search query.

4. The method of claim 1, further comprising determining a promotion number that indicates a number of entities to be added to the top subset of entities.

5. The method of claim 4, wherein determining the promotion number comprises determining that the promotion number is equal to a number of the plurality of regions multiplied by a promotion factor.

6. The method of claim 1, wherein the top subset of entities includes a first entity located in a first region and having a first rank and a second entity located in the first region and having a second rank that is lower than the first rank, the remainder of the entities includes a third entity located in a second region and having a third rank that is lower than the second rank, and modifying the rankings comprises:
   modifying the ranking of the third entity to be equal to the second rank and modifying the ranking of the second entity to be equal to the third rank.

7. The method of claim 6, wherein modifying the rankings comprises updating the entity score of the third entity to fall between the entity score of the first entity and the entity score of the second entity.

8. The method of claim 6, wherein modifying the ranking comprises:
   creating a first entity group associated with the first region and including the first entity and the second entity;
   creating a second entity group associated with the second region and including the third entity;
   selecting the first entity from the first entity group and the third entity from the second entity group; and
   setting the rank of the first entity to the first rank and setting the rank of the third entity to be the second rank.

9. A computer implemented method, comprising:
   receiving a search query from a client device, the search query including a query region;
   accessing a plurality of entities associated with a geographical location, each of the entities located in one of a plurality of regions;
   computing, by a computer processor, a entity score for each of the entities based at least on the query region and the region in which the entity is located;
   ranking the entities according to the entity scores, the ranked entities including a top subset of entities ranked above a remainder of the entities in the ranked entities, the top subset of entities located in a subset of the regions;
   re-computing the entity score for a first entity having a lower rank than a second and a third entities, the first entity located in one of the regions not included in a subset of the regions, the recomputed entity score computed based on a combination of the entity scores of the second and third entities and falling between the entity scores of the second and third entities;
   determining a query relevance for each of the regions, the query relevance indicating a relevance of the region to the query region;
   modifying the rankings of the entities based on the recomputed entity score and the determined query relevance for each of the regions, the modifying comprising ranking the first entity between the second entity and the third entity and decreasing the ranking of at least one entity based on the query relevance of the region in which the entity is located;
   re-computing the entity scores for each of a plurality of entities in the remainder of the entities, each of the recomputed entity scores based on a combination of the entity scores of a most recently promoted entity score and a lower ranked score;
   modifying the rankings based on the recomputed entity scores; and
   providing, to the client device, information for display as a graphical user interface on a display of the client device, the user interface including an ordered list of the plurality of entities based on the modified rankings to the client device, the user interface for allowing the user to select and book a entity of the plurality of entities.

10. The method of claim 9, wherein modifying the rankings of the entities comprises:
    computing a demotion factor associated with each of the plurality of regions based on the query relevance for the region; and
    modifying the entity scores for the entities by applying to each entity score the demotion factor associated with the region in which the entity is located.

11. The method of claim 10, wherein computing a demotion factor associated with a second region comprises:
  determining a promotion number for a first region based on the query relevance for the first region, the promotion number indicating a number of entities to be promoted; and
  computing the demotion factor associated with the second region based on the promotion number, the second region having a query relevance that is less than the query relevance for the first region.

12. The method of claim 11, wherein computing the demotion factor associated with the second region comprises:
  determining the entity score of a top scoring entity located in the first region;
  determining the entity score of a first entity located in the second region that has a rank equal to the promotion number; and
  computing the demotion factor based on the entity score of the top scoring entity and the entity score of the first entity.

13. A non-transitory computer readable medium storing instructions, the instructions when executed cause the processor to:
  receive a search query from a client device, the search query including a geographic area that includes at least a plurality of regions;
  access a plurality of entities associated with a geographical location, each of the entities located in one of the plurality of regions;
  compute, by a computer processor, a entity score for each of the entities based at least on the region in which the entity is located and the search query;
  rank the entities according to the entity scores, the ranked entities including a top subset of entities ranked above a remainder of the entities in the ranked entities, the top subset of entities located in a subset of the regions;
  re-compute the entity score for a first entity in the remainder of the entities based on a combination of the entity scores of a second entity and a third entity in the top subset of entities, the first entity located in one of the regions not included in the subset of the regions, the recomputed entity score falling between the entity scores of the second entity and the third entity;
  modify the rankings of the top subset of entities based on the recomputed entity score to add the first entity to the top subset of entities between the second entity and the third entity;
  re-compute the entity scores for each of a plurality of entities in the remainder of the entities, each of the recomputed entity scores based on a combination of the entity scores of a most recently promoted entity score and a lower ranked score;
  modify the rankings based on the recomputed entity scores; and
  provide, to the client device, information for display as a graphical user interface on a display of the client device, the user interface including an ordered list of the plurality of entities based on the modified rankings to the client device, the user interface for allowing the user to select and book a entity of the plurality of entities.

14. The computer readable medium of claim 13, wherein the geographic area includes regions other than the plurality of regions.

15. The computer readable medium of claim 14, wherein the instructions when executed further cause the processor to compute a relevance between the search query and each of the regions included in the geographic area to determine that the plurality of regions are relevant to the search query.

16. The computer readable medium of claim 13, wherein the instructions when executed further cause the processor to determine a promotion number that indicates a number of entities to be added to the top subset of entities.

17. A non-transitory computer readable medium storing instructions, the instructions when executed cause the processor to:
  receive a search query from a client device, the search query including a query region;
  access a plurality of entities associated with a geographical location, each of the entities located in one of a plurality of regions;
  compute, by a computer processor, a entity score for each of the entities based at least on the query region and the region in which the entity is located;
  rank the entities according to the entity scores, the ranked entities including a top subset of entities ranked above a remainder of the entities in the ranked entities, the top subset of entities located in a subset of the regions;
  re-compute the entity score for a first entity having a lower rank than a second and a third entities, the first entity located in one of the regions not included in a subset of the regions, the recomputed entity score computed based on the entity scores of the second and third entities and falling between the entity scores of the second and third entities;
  determine a query relevance for each of the regions, the query relevance indicating a relevance of the region to the query region;
  modify the rankings of the entities based on the recomputed entity score and the determined query relevance for each of the regions, the modifying comprising ranking the first entity between the second entity and the third entity and decreasing the ranking of at least one entity based on the query relevance of the region in which the entity is located;
  re-compute the entity scores for each of a plurality of entities in the remainder of the entities, each of the recomputed entity scores computed based on a combination of the entity scores of a most recently promoted entity score and a lower ranked score;
  modify the rankings based on the recomputed entity scores; and
  provide, to the client device, information for display as a graphical user interface on a display of the client device, the user interface including an ordered list of the plurality of entities based on the modified rankings to the client device, the user interface for allowing the user to select and book a entity of the plurality of entities.

18. The computer readable medium of claim 17, wherein modifying the rankings of the entities comprises:
  computing a demotion factor associated with each of the plurality of regions based on the query relevance for the region; and
  modifying the entity scores for the entities by applying to each entity score the demotion factor associated with the region in which the entity is located.

19. The computer readable medium of claim 18, wherein computing a demotion factor associated with a second region comprises:

determining a promotion number for a first region based on the query relevance for the first region, the promotion number indicating a number of entities to be promoted; and computing the demotion factor associated with the second region based on the promotion number, the second region having a query relevance that is less than the query relevance for the first region.

20. The computer readable medium of claim 19, wherein computing the demotion factor associated with the second region comprises:

determining the entity score of a top scoring entity located in the first region;

determining the entity score of a first entity located in the second region that has a rank equal to the promotion number; and computing the demotion factor based on the entity score of the top scoring entity and the entity score of the first entity.

\* \* \* \* \*

UNITED STATES PATENT AND TRADEMARK OFFICE
CERTIFICATE OF CORRECTION

PATENT NO. : 10,303,725 B2  
APPLICATION NO. : 14/267204  
DATED : May 28, 2019  
INVENTOR(S) : Maxim Charkov and Surabhi Gupta Page 1 of 1

It is certified that error appears in the above-identified patent and that said Letters Patent is hereby corrected as shown below:

In the Claims

Column 21, Claim 1, Line 42, delete "book a entity," insert --book an entity--.

Column 22, Claim 9, Line 21, delete "a entity score," insert --an entity score--.

Column 22, Claim 9, Line 58, delete "book a entity," insert --book an entity--.

Column 23, Claim 13, Line 31, delete "a entity score," insert --an entity score--.

Column 23, Claim 13, Line 61, delete "book a entity," insert --book an entity--.

Column 24, Claim 17, Line 17, delete "a entity score," insert --an entity score--.

Column 24, Claim 17, Line 25, delete "a third entities," insert --a third entity--.

Column 24, Claim 17, Line 55, delete "book a entity," insert --book an entity--.

Signed and Sealed this  
First Day of October, 2019

Andrei Iancu  
*Director of the United States Patent and Trademark Office*